US012570233B2

(12) United States Patent
Yokoyama et al.

(10) Patent No.: US 12,570,233 B2
(45) Date of Patent: Mar. 10, 2026

(54) SEAT BELT RETRACTOR

(71) Applicant: ASHIMORI INDUSTRY CO., LTD.,
Settsu (JP)

(72) Inventors: Taro Yokoyama, Settsu (JP); Satoshi Suminaka, Settsu (JP); Takayoshi Ijiri, Settsu (JP); Noriko Kurauchi, Settsu (JP); Eri Fujiwara, Settsu (JP); Daiki Hijikata, Settsu (JP)

(73) Assignee: ASHIMORI INDUSTRY CO., LTD.,
Settsu (JP)

( * ) Notice: Subject to any disclaimer, the term of this patent is extended or adjusted under 35 U.S.C. 154(b) by 111 days.

(21) Appl. No.: 18/599,731

(22) Filed: Mar. 8, 2024

(65) Prior Publication Data

US 2024/0300441 A1     Sep. 12, 2024

(30) Foreign Application Priority Data

Mar. 9, 2023     (JP) ................................. 2023-036424

(51) Int. Cl.
B60R 22/42     (2006.01)
(52) U.S. Cl.
CPC .................................... B60R 22/42 (2013.01)
(58) Field of Classification Search
CPC . B60R 22/38; B60R 22/42; B60R 2022/4406; B60R 2022/4413; B60R 2022/468; B60R 2022/4453; B60R 2022/4426
USPC ....... 242/396, 396.1, 396.4, 375, 375.3, 382
See application file for complete search history.

(56) References Cited

U.S. PATENT DOCUMENTS

| | | | | | |
|---|---|---|---|---|---|
| 5,687,926 | A | * | 11/1997 | Park ...................... | B60R 22/405 242/383.4 |
| 7,607,604 | B2 | * | 10/2009 | Scherzinger ............ | B60R 22/46 242/390.8 |
| 7,641,139 | B2 | * | 1/2010 | Ng .......................... | B60R 22/46 242/382.5 |
| 2001/0008261 | A1 | * | 7/2001 | Yano ...................... | B60R 22/44 242/375.3 |
| 2003/0132334 | A1 | * | 7/2003 | Koning ............... | B60R 22/3413 242/382 |
| 2004/0095010 | A1 | * | 5/2004 | Strobel ................. | B60R 22/405 297/475 |

(Continued)

FOREIGN PATENT DOCUMENTS

JP     4118667 B2 *  7/2008

*Primary Examiner* — Anna M Momper
*Assistant Examiner* — Ermia E. Melika
(74) *Attorney, Agent, or Firm* — Sughrue Mion, PLLC

(57) ABSTRACT

A seat belt retractor includes a housing including a pair of side walls facing each other, a winding drum configured to wind up a webbing, the winding drum being housed between the pair of side walls so as to be rotatable in a winding direction and a pull-out direction of the webbing, a lock member provided at a first end portion, of the winding drum, located on one side in an axial direction of the winding drum, a biasing member including one end portion attached to the first end portion of the winding drum, the other end portion attached to the lock member, and a connecting portion connecting the one end portion and the other end portion, a shaft member attached to the first end portion of the winding drum, and a cover member attached to the housing.

7 Claims, 15 Drawing Sheets

(56)     References Cited

U.S. PATENT DOCUMENTS

| 2005/0150988 A1* | 7/2005 | Bell ...................... B60R 22/405 |
| | | 242/382 |
| 2015/0108263 A1* | 4/2015 | Suminaka ............. B60R 22/405 |
| | | 242/379.1 |
| 2018/0215343 A1* | 8/2018 | Nagata ................... B60R 22/36 |
| 2019/0143933 A1* | 5/2019 | Hirsch ................. B60R 22/405 |
| | | 242/382.2 |
| 2020/0164833 A1* | 5/2020 | Owaki ................. B60R 22/405 |
| 2021/0061220 A1* | 3/2021 | Yamamoto ............. B60R 21/01 |
| 2023/0086721 A1* | 3/2023 | Sato ........................ B60R 22/48 |
| | | 242/362 |

* cited by examiner

UP

REAR

RIGHT

LEFT

FRONT

DOWN

1C

12

62
87
11
79
11a, 11b 63
61
79
9B
87
8 (6)
79
87

21

16

23

2

UP

FRONT ← → REAR

DOWN

RIGHT ⟷ LEFT

SEAT BELT RETRACTOR

CROSS-REFERENCE TO RELATED APPLICATIONS

This application is based on and claims priority under 35 USC 119 from Japanese Patent Application No. 2023-036424 filed on Mar. 9, 2023, the entire content of which is incorporated herein by reference.

TECHNICAL FIELD

The present disclosure relates to a seat belt retractor configured to prevent a webbing from being pulled out in an emergency such as vehicle collision.

BACKGROUND ART

In the related art, there is a seat belt retractor configured to prevent a webbing from being pulled out in an emergency of a vehicle. In the seat belt retractor, a winding drum configured to wind up the webbing is rotatably housed between a pair of side walls of a housing.

For example, JP4118667B discloses a seat belt retractor in which a first end portion of a winding drum on one side in an axial direction of the winding drum is provided with a lock member (referred to as a "lock plate" in JP4118667B) configured to prevent the winding drum from being rotated in a pull-out direction in an emergency of a vehicle.

Specifically, in the seat belt retractor disclosed in JP4118667B, the winding drum includes a drum main body, and a locking base (referred to as a "lock base" in JP4118667B) attached to one end surface of the drum main body, and the lock member is swingably attached to the locking base.

In the seat belt retractor disclosed in JP4118667B, the drum main body is hollow, the winding drum includes a torsion bar disposed inside the drum main body, and the torsion bar penetrates the locking base. A return spring is attached to a distal end portion of the torsion bar, which protrudes outward from the locking base. The return spring biases the lock member so as to be maintained at a non-engagement position at which the winding drum is allowed to be rotated in the pull-out direction.

The one side wall of the housing is formed with internal teeth, and the lock member has a plurality of engaging teeth configured to be engageable with the internal teeth. In the emergency of the vehicle, the lock member is moved to an engagement position at which the winding drum is prevented from being rotated in the pull-out direction against a biasing force of the return spring, and the engaging teeth of the lock member are engaged with the internal teeth formed on the one side wall of the housing.

The return spring includes a spiral spring portion attached to the distal end portion of the torsion bar, a locking portion attached to a guide protrusion provided on the lock member, and an arm portion connecting the spring portion and the locking portion.

In the seat belt retractor disclosed in JP4118667B, a lock cover having a thin circular shape is attached to the locking base in order to prevent the lock member from being detached. The lock cover has a larger diameter than the locking base and serves to prevent the return spring from being detached.

However, in a structure in which the return spring, which is a biasing member, is prevented from being detached from the winding drum by a large lock cover as in the seat belt retractor disclosed in JP4118667B, a worker cannot visually check the biasing member after the lock cover is attached, and workability of assembly is poor. There is also a problem that the large lock cover has a large number of useless portions.

SUMMARY OF INVENTION

Aspect of non-limiting embodiments of the present disclosure relates to provide a seat belt retractor capable of preventing a biasing member from being detached from a winding drum without impairing workability of assembly.

Aspects of certain non-limiting embodiments of the present disclosure address the features discussed above and/or other features not described above. However, aspects of the non-limiting embodiments are not required to address the above features, and aspects of the non-limiting embodiments of the present disclosure may not address features described above.

According to an aspect of the present disclosure, there is provided a seat belt retractor including:

a housing including a pair of side walls facing each other;

a winding drum configured to wind up a webbing, the winding drum being housed between the pair of side walls so as to be rotatable in a winding direction and a pull-out direction of the webbing;

a lock member provided at a first end portion, of the winding drum, located on one side in an axial direction of the winding drum, the lock member being configured to be movable between: an engagement position in which rotation of the winding drum in the pull-out direction is prevented by the lock member being engaged with the housing or a member attached to the housing; and a non-engagement position in which the rotation of the winding drum in the pull-out direction is allowed, the lock member being moved to the engagement position in an emergency of a vehicle;

a biasing member including: one end portion attached to the first end portion of the winding drum; the other end portion attached to the lock member; and a connecting portion connecting the one end portion and the other end portion, the biasing member being configured to bias the lock member to maintain the lock member at the non-engagement position;

a shaft member attached to the first end portion of the winding drum, the shaft member including a shaft portion coaxial with the winding drum; and a cover member attached to the housing, the cover member rotatably supporting the shaft portion of the shaft member, in which the shaft member includes an arm extending, from the shaft portion, outward in a radial direction, and the arm is configured to be able to come into contact with the connecting portion of the biasing member from a side opposite to the winding drum.

BRIEF DESCRIPTION OF DRAWINGS

Exemplary embodiment(s) of the present invention will be described in detail based on the following figures, wherein.

DESCRIPTION OF EMBODIMENTS

Figure 1:
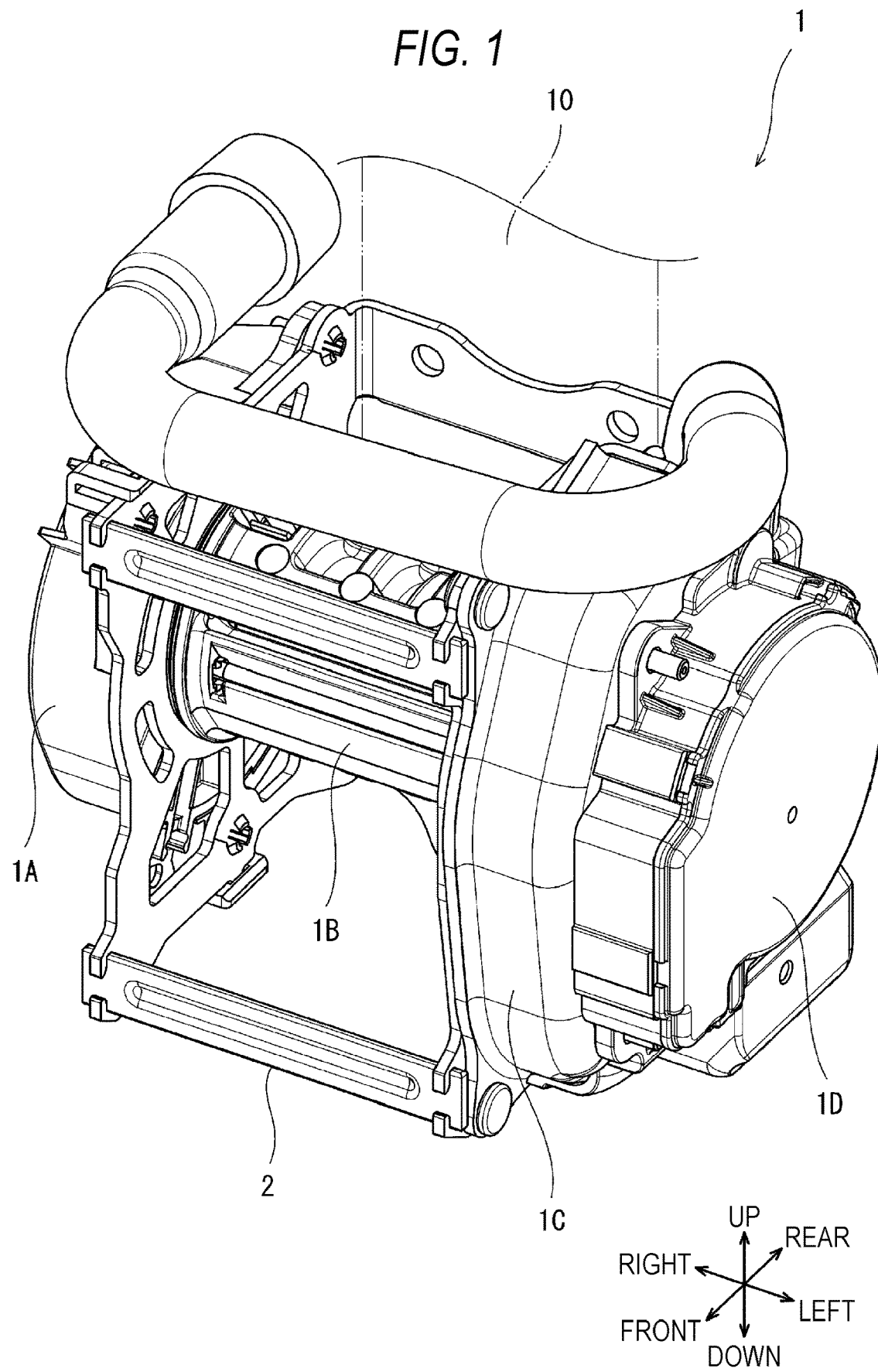
FIG. 1 is a perspective view of a seat belt retractor according to an embodiment of the present disclosure.
Figure 2:
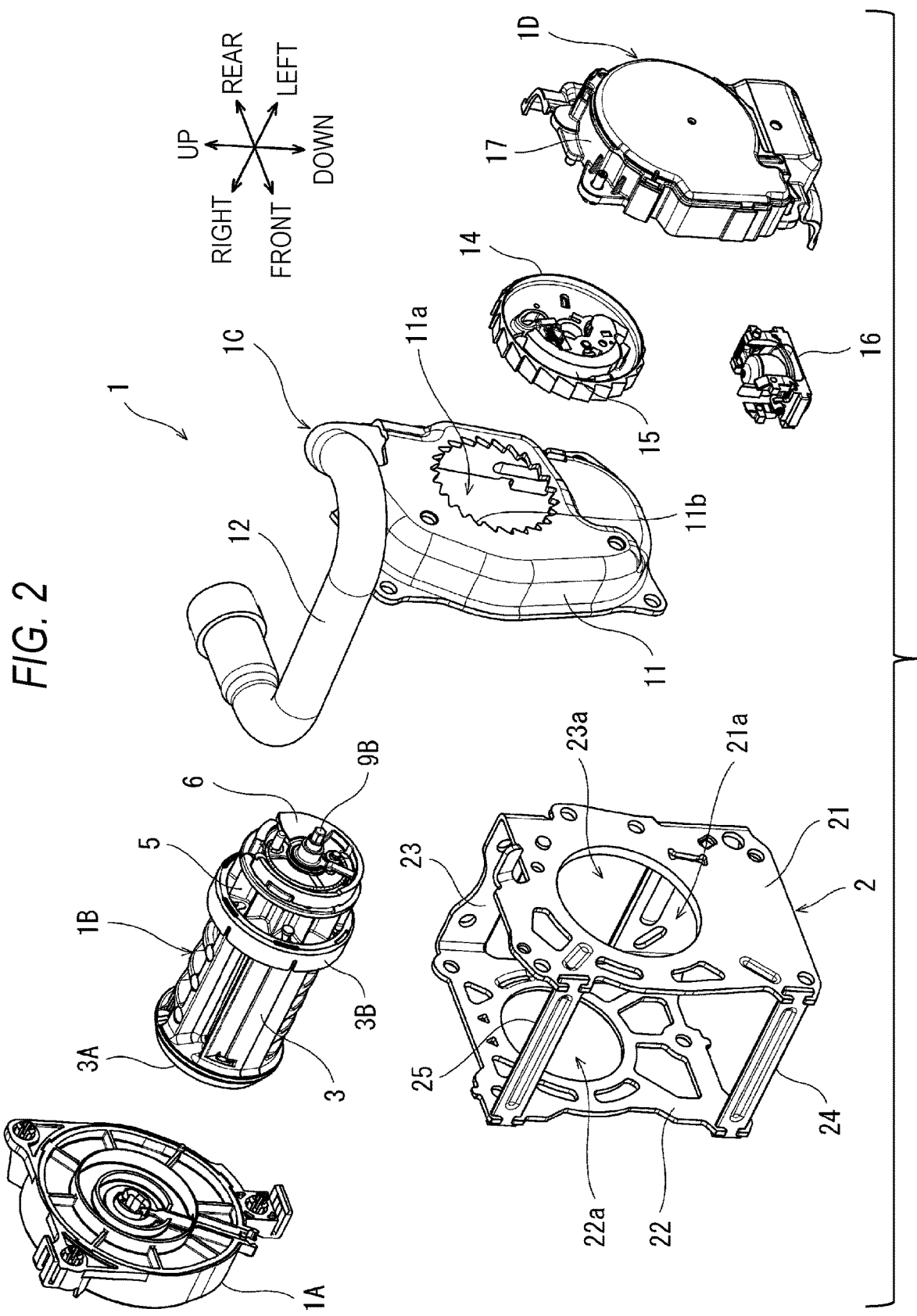
FIG. 2 is an exploded perspective view of the seat belt retractor illustrated in FIG. 1.

FIGS. 1 and 2 illustrate a seat belt retractor 1 according to an embodiment of the present disclosure. The seat belt retractor 1 is configured to prevent a webbing 10, which is a seat belt, from being pulled out in an emergency such as vehicle collision.

Specifically, the seat belt retractor 1 includes a housing 2, a winding spring unit 1A, a winding drum 1B, a pretensioner 1C, and a lock unit 1D. The housing 2 includes a first side wall 21 and a second side wall 22 that face each other in an axial direction of the winding drum 1B.

The winding drum 1B is configured to wind up the webbing 10, and is housed between the first side wall 21 and the second side wall 22 so as to be rotatable in a winding direction and a pull-out direction of the webbing 10.

The housing 2 includes a back plate 23 that is formed by sheet metal processing together with the first side wall 21 and the second side wall 22, and that is perpendicular to the first side wall 21 and the second side wall 22. Hereinafter, for convenience of description, the axial direction of the winding drum 1B is referred to as a left-right direction (one side of a first side wall 21 side is referred to as a leftward direction, and the other side of a second side wall 22 side is referred to as a rightward direction), and a thickness direction of the back plate 23 is referred to as a front-rear direction (a side of the side walls 21 and 22 is referred to as a forward direction, and an opposite side is referred to as a rearward direction). As illustrated in FIGS. 1 and 2, one side of a direction orthogonal to the left-right direction and the front-rear direction is referred to as an upward direction, and the other side of the direction orthogonal to the left-right direction and the front-rear direction is referred to as a downward direction.

Lower portions and upper portions of front sides of the first side wall 21 and the second side wall 22 of the housing 2 are connected by connecting bars 24 and 25. The first side wall 21 and the second side wall 22 are respectively provided with openings 21a and 22a through which the winding drum 1B is inserted. In addition, the back plate 23 is provided with an opening 23a through which the winding drum 1B is exposed.

The winding spring unit 1A is attached to the second side wall 22. The pretensioner 1C is attached to the first side wall 21 of the housing 2. The lock unit 1D is attached to the pretensioner 1C.

The winding drum 1B includes a drum main body 3, a locking base 6 that is disposed in the leftward direction with respect to the drum main body 3 and that is configured to be rotatable relative to the drum main body 3 in an emergency of a vehicle, and an annular (see FIG. 3) drive wheel 5 attached to the locking base 6. That is, the locking base 6 configures a left end portion (a first end portion on one side in the axial direction) of the winding drum 1B. The drive wheel 5 is also a component of the pretensioner 1C.

Figure 3:
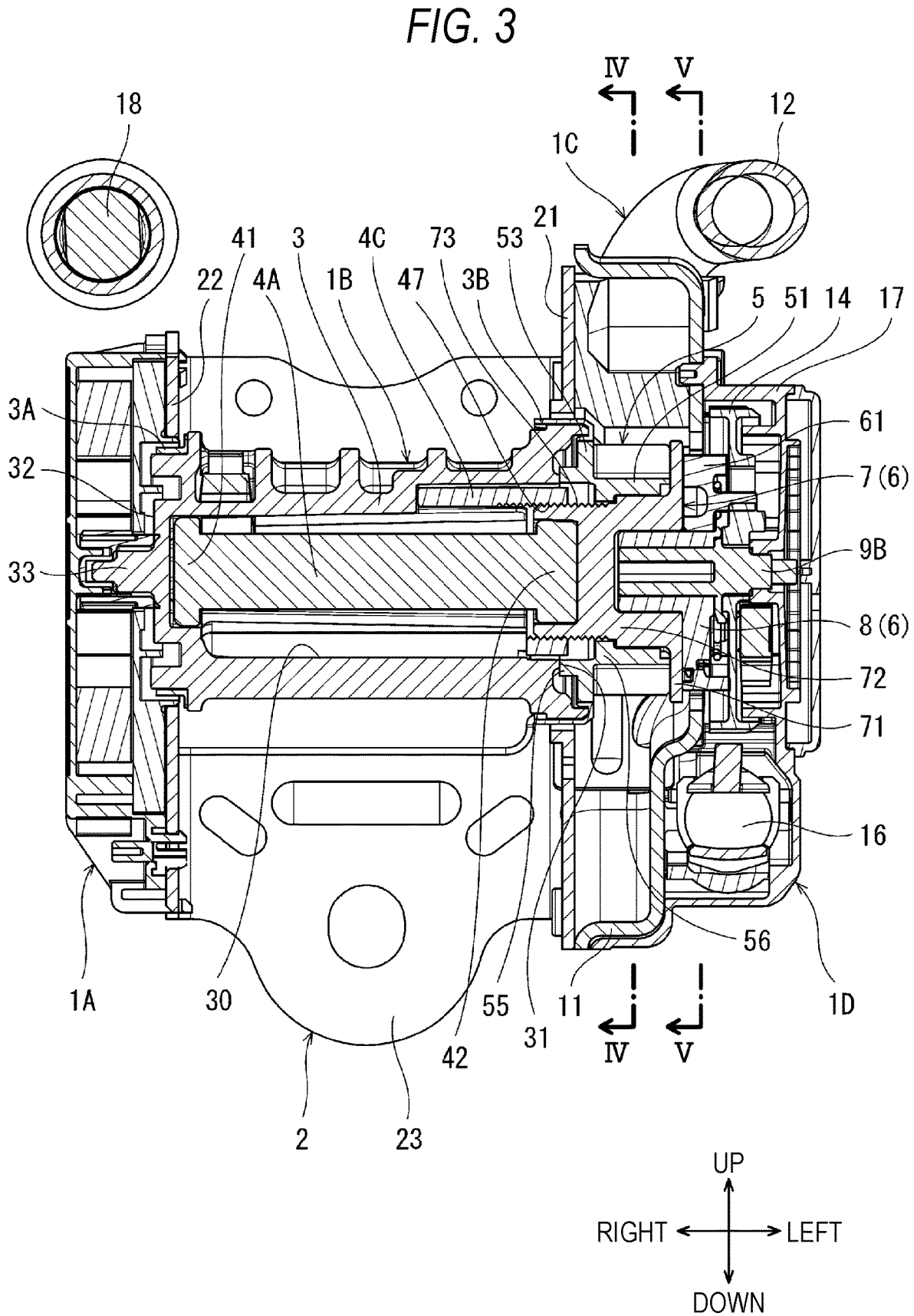
FIG. 3 is a cross-sectional view of the seat belt retractor illustrated in FIG. 1.

As illustrated in FIG. 3, the drum main body 3 includes a first end surface 31 on a side of the first side wall 21 of the housing 2, and a second end surface 32 on a side of the second side wall 22 of the housing 2. In the present embodiment, the drum main body 3 includes a shaft portion 33 that protrudes from the second end surface 32 in the rightward direction, and the shaft portion 33 is rotatably supported by the winding spring unit 1A. However, a torsion bar 4A to be described later may penetrate the drum main body 3, and a right end portion of the torsion bar 4A may be rotatably supported by the winding spring unit 1A. Since a configuration of the winding spring unit 1A is known, a detailed description thereof will be omitted.

Figure 6:
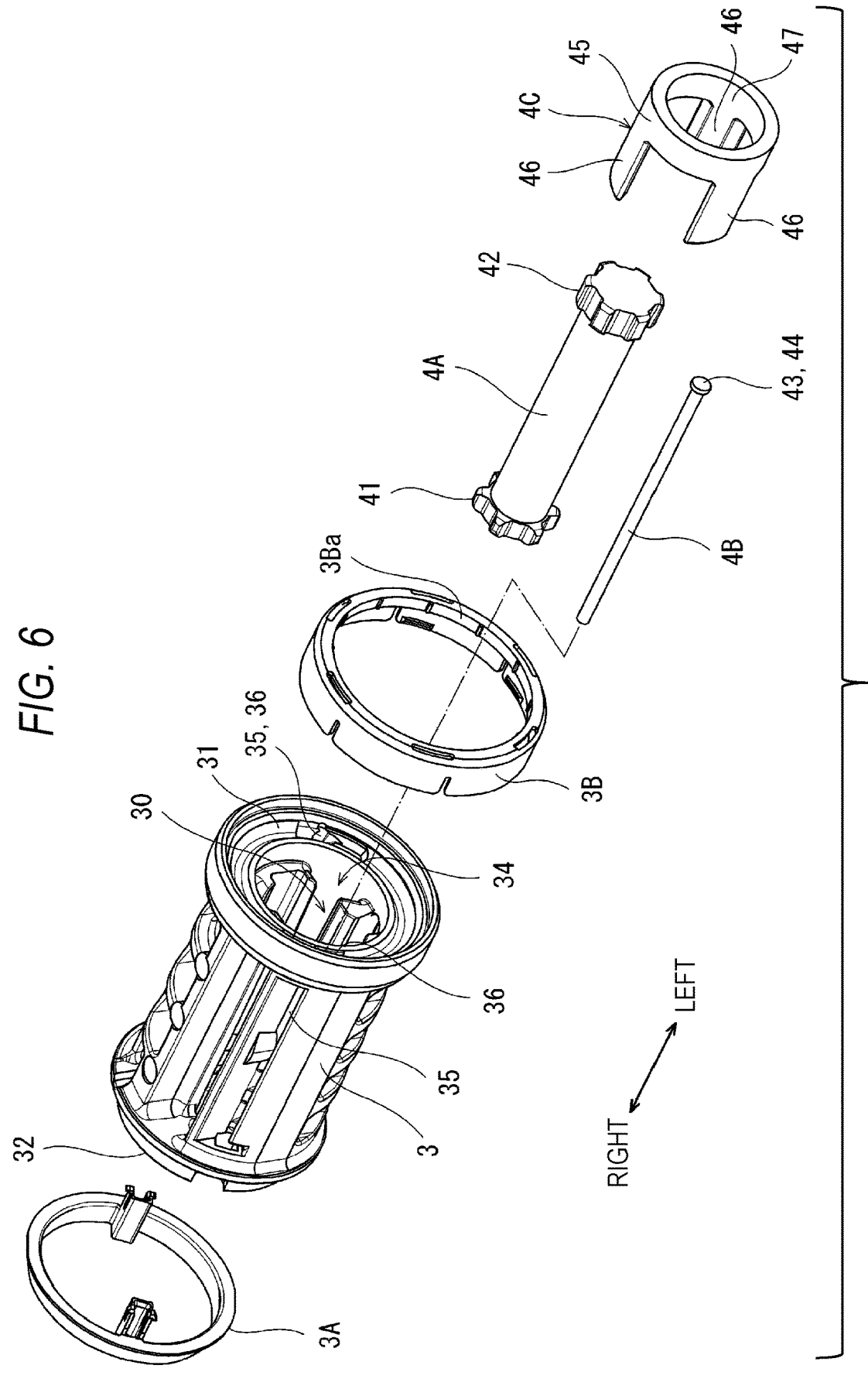
FIG. 6 is an exploded perspective view of a part of a winding drum.
Figure 7:
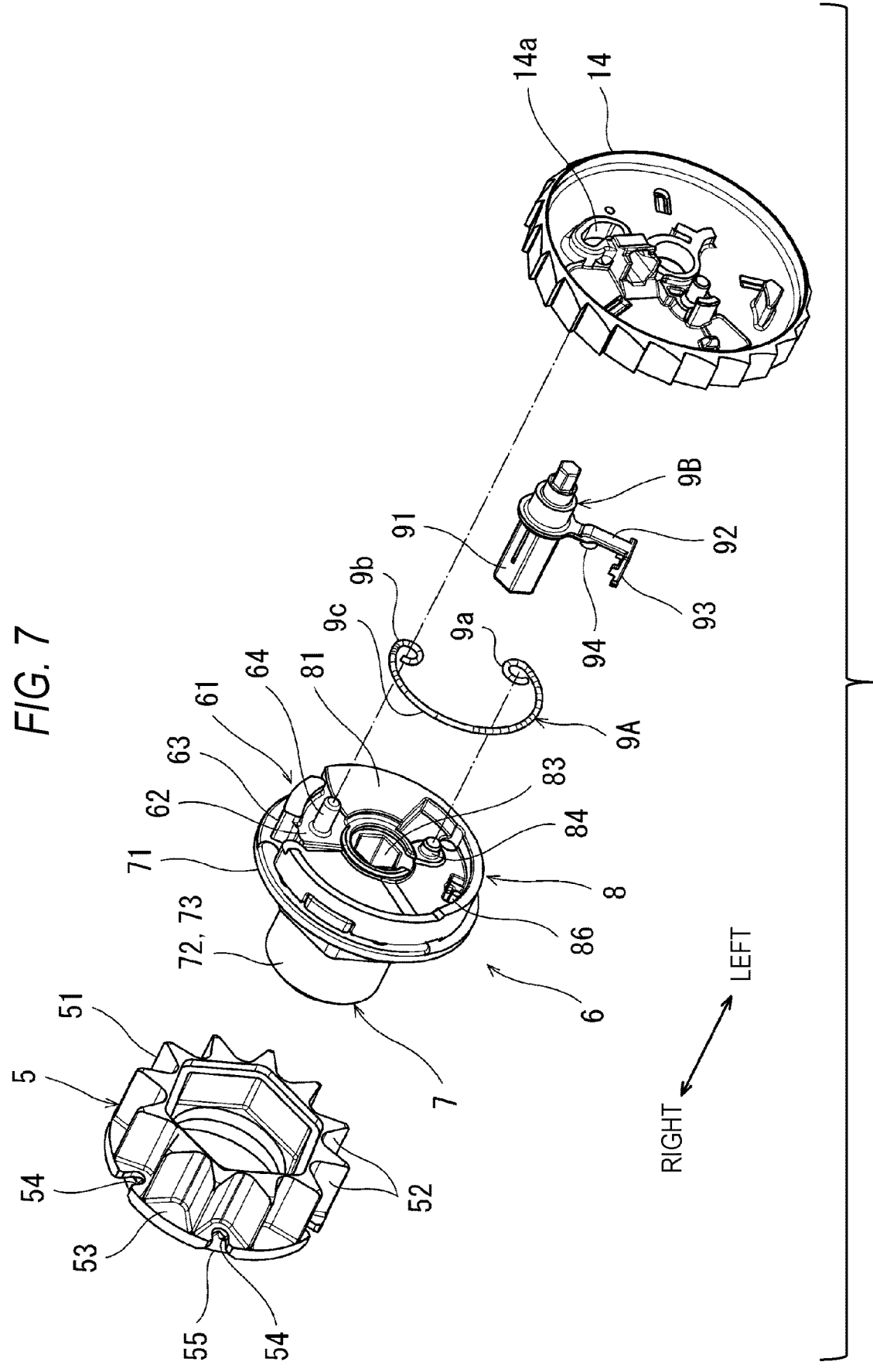
FIG. 7 is an exploded perspective view of the rest of the winding drum, a biasing member, a shaft member, and a guide member.

As illustrated in FIGS. 6 and 7, the winding drum 1B includes a bush 3A, a bearing 3B, the torsion bar 4A, an impact energy absorbing wire 4B, and a stopper member 4C, in addition to the drum main body 3, the locking base 6, and the drive wheel 5. A biasing member 9A and a shaft member 9B are attached to the locking base 6 configures the left end portion of the winding drum 1B.

The bush 3A and the bearing 3B are emergency means for smoothly rotating the winding drum 1B even when a relative position of the winding drum 1B with respect to the housing 2 is shifted in the emergency of the vehicle. As illustrated in FIG. 3, the bush 3A is attached to a right end portion of the drum main body 3, which is positioned in the opening 22a of the second side wall 22, and the bearing 3B is attached to a left end portion of the drum main body 3, which is positioned in the opening 21a of the first side wall 21. Further, the bearing 3B includes a folded portion 3Ba (see FIG. 6) that is folded back to an inner side of the left end portion of the drum main body 3, and that is configured to slide with the drive wheel 5, which is attached to the locking base 6 without being rotatable relative to the locking base 6, in a case where the drum main body 3 and the locking base 6 are rotated relative to each other.

The drum main body 3 has a center hole 30 extending along a center axis of the drum main body 3. In the present embodiment, the center hole 30 is bottomed and is opened only to the first end surface 31. However, in a case where the torsion bar 4A penetrates the drum main body 3 as described above, the center hole 30 may be opened not only to the first end surface 31 but also to the second end surface 32.

The torsion bar 4A is inserted into the center hole 30 of the drum main body 3. The locking base 6 is disposed to face the first end surface 31 of the drum main body 3. The torsion bar 4A includes one end side, opposite to the locking base 6, coupled to the drum main body 3 without being rotatable relative to the drum main body 3, and the other end side coupled to the locking base 6 without being rotatable relative to the locking base 6.

More specifically, the torsion bar 4A includes spline-shaped coupling portions 41 and 42 on the one end side and the other end side, respectively. The bottom of the center hole of the drum main body 3 includes a spline-shaped recess for coupling with the coupling portion 41, and the coupling portion 41 is fitted into the recess.

The torsion bar 4A is configured to be plastically deformed in a case where a pull-out force of the webbing 10 exceeds a predetermined value in a state where the locking base 6 is prevented from being rotated in the pull-out direction, so as to absorb impact energy while allowing the relative rotation between the drum main body 3 and the locking base 6.

Figure 8:
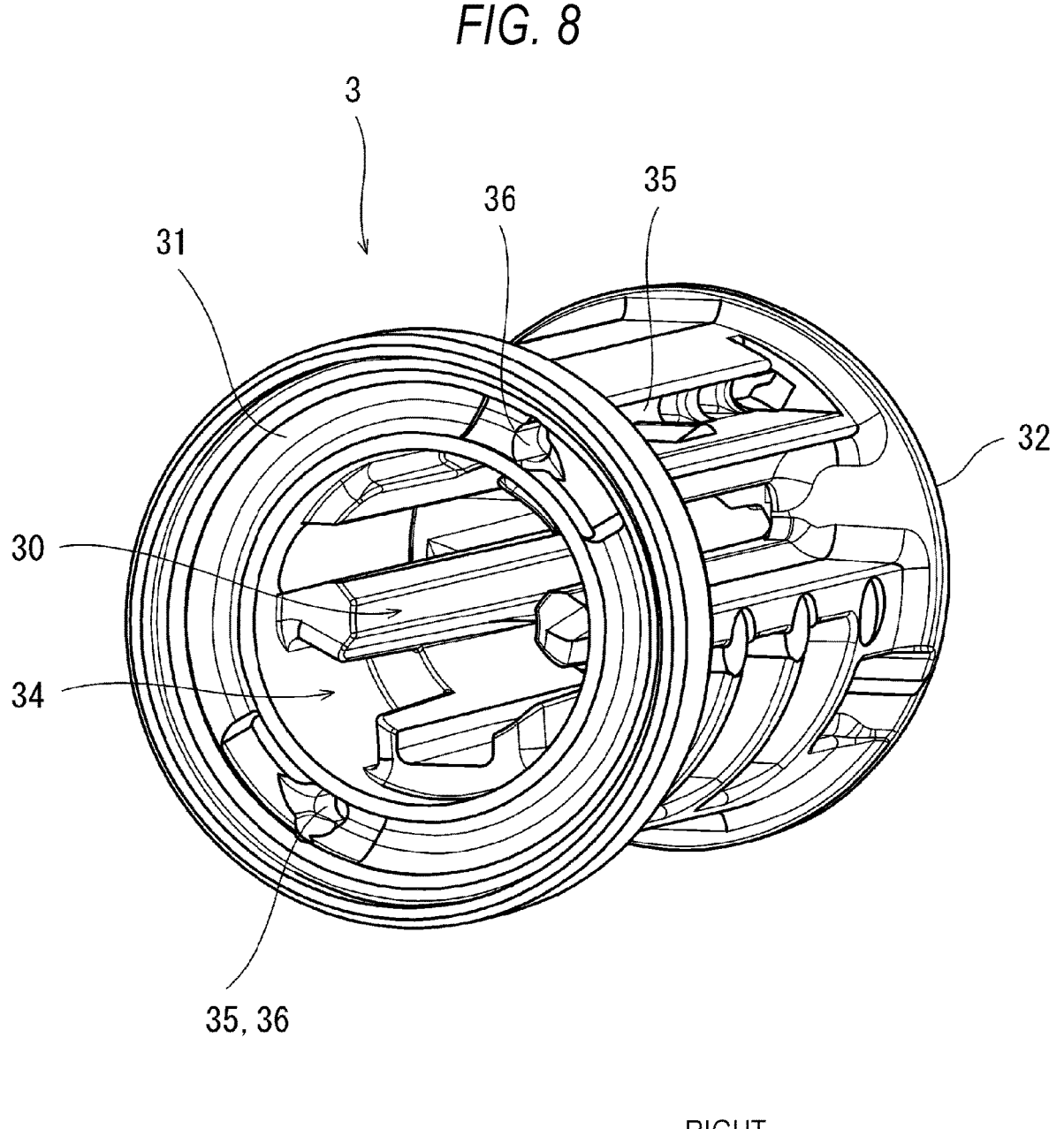
FIG. 8 is a perspective view of a drum main body.

The impact energy absorbing wire 4B is configured to absorb impact energy at an initial stage when the drum main body 3 and the locking base 6 are rotated relative to each other. In the present embodiment, as illustrated in FIG. 8, the drum main body 3 includes two slots 35 that are opened in the first end surface 31. In the present embodiment, although each slot 35 has a groove shape recessed obliquely from an outer circumferential surface of the drum main body 3, and the slot 35 may be a hole extending in an axial direction of the drum main body 3.

The impact energy absorbing wire 4B is housed in one of the slots 35 in a state where a head portion 43 (see FIG. 6) protrudes from an opening 36 of the slot 35. The impact energy absorbing wire 4B is configured to be pulled out from the opening 36 while being plastically deformed in a case where the drum main body 3 and the locking base 6 are relatively rotated, so as to absorb the impact energy. Incidentally, the impact energy absorbing wire 4B may be omitted.

The stopper member 4C defines an allowable amount of the relative rotation between the drum main body 3 and the locking base 6 in a case where the torsion bar 4A absorbs the impact energy. The stopper member 4C is held in the center hole 30 of the drum main body 3 without being rotatable relative to the drum main body 3 and so as to be movable in the left-right direction.

As illustrated in FIG. 6, the stopper member 4C has a tubular shape through which the torsion bar 4A is inserted. The stopper member 4C is formed with a female screw 47 on an inner circumferential surface of the stopper member 4C.

In the present embodiment, the stopper member 4C includes an annular portion 45 and three claw portions 46 that protrude from the annular portion 45 in the rightward direction. On the other hand, the center hole 30 of the drum main body 3 includes three guide grooves 34. Since the three claw portions 46 are fitted into the respective three guide grooves 34, the stopper member 4C is held by the drum main body 3 without being rotatable relative to the drum main body 3 and so as to be movable in the left-right direction. However, instead of the stopper member 4C including the claw portions 46, a cross-sectional shape of an outer shape of the stopper member 4C and a cross-sectional shape of a left end portion of the center hole 30 of the drum main body 3 may be polygonal.

As illustrated in FIGS. 3 and 7, the locking base 6 is formed with a male screw 73 onto which the female screw 47 of the stopper member 4C is screwed. In the present embodiment, as illustrated in FIG. 3, during the relative rotation between the drum main body 3 and the locking base 6, the stopper member 4C moves from a position at which the stopper member 4C is separated from the drive wheel 5 to a position at which the stopper member 4C comes into contact with the drive wheel 5, whereby the relative rotation between the drum main body 3 and the locking base 6 is restricted to a predetermined amount.

Figure 9:
FIG. 9 is a perspective view of a drive wheel.

As illustrated in FIGS. 7 and 9, the drive wheel 5 includes a main body portion 51 having a fitting hole with a hexagonal cross-sectional shape, a plurality of teeth 52 formed on an outer circumferential surface of the main body portion 51, an annular flange 53 that protrudes outward in a radial direction from the main body portion 51 on a right side of the teeth 52, and a ring-shaped rib 55 that protrudes from the flange 53 in the rightward direction.

The flange 53 includes a plurality of (six in the illustrated example) holding grooves 54. The head portion 43 of the impact energy absorbing wire 4B is attached to one of the holding grooves 54. The head portion 43 of the impact energy absorbing wire 4B includes a coming-off prevention portion 44 (see FIG. 6) having a larger width than the holding groove 54.

As illustrated in FIG. 3, in the present embodiment, the drive wheel 5 comes into contact with the first end surface 31 of the drum main body 3 by the rib 55. The impact energy absorbing wire 4B is pulled out from the opening 36 of the slot 35 while being wound around the rib 55. In a case where the drum main body 3 and the locking base 6 is rotated relative to each other, the drive wheel 5, attached to the locking base 6 without being rotatable relative to the locking base 6, is rotated relative to the drum main body 3 while the rib 55 of the drive wheel 5 comes into contact with the first end surface 31 of the drum main body 3 in the axial direction of the drum main body 3, and while an outer circumference of the flange 53 of the drive wheel 5 comes into contact with the folded portion 3Ba of the bearing 3B attached to the drum main body 3 in a radial direction of the drum main body 3.

Further, an annular flange 56 protrudes from an inner circumferential surface of the main body portion 51. The flange 56 is a portion that comes into contact with the stopper member 4C. In this way, it is possible to secure a large contact area between the flange 56 and the stopper member 4C by bringing the stopper member 4C into contact with the flange 56 of the drive wheel 5 instead of a stepped portion of the locking base 6.

Figure 4:
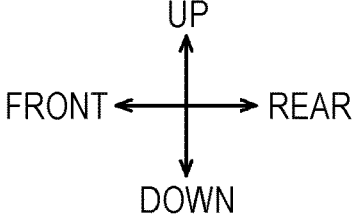
FIG. 4 is a cross-sectional view taken along a line IV-IV in FIG. 3.

The pretensioner 1C is configured to rotate the winding drum 1B in the winding direction, in the emergency of the vehicle. As illustrated in FIGS. 2 to 4, the pretensioner 1C includes a pretensioner casing 11 attached to the first side wall 21 of the housing 2, a pipe 12 extending from the pretensioner casing 11 while being bent, a moving member 13 disposed in the pipe 12, and a gas generator 18 disposed in a distal portion of the pipe 12.

In the present embodiment, the moving member 13 has a rod shape, and is configured to be plastically deformed by the digging of the teeth 52 of the drive wheel 5. However, the moving member 13 may be implemented by a plurality of divided bodies (for example, spheres) arranged at the same pitch as the teeth 52 of the drive wheel 5. In the emergency of the vehicle, the moving member 13 is engaged with the teeth 52 of the drive wheel 5 while being pushed out from the pipe 12 by gas generated in the gas generator 18 so as to rotate the drive wheel 5. As the drive wheel 5 is rotated, the locking base 6, the torsion bar 4A, and the drum main body 3 are also rotated. After the pretensioner 1C is activated, the moving member 13 is prevented from being pushed back into the pipe 12 by a pressure of the gas in the pipe 12, and thus the drive wheel 5 is prevented from being rotated in the pull-out direction.

Figure 5:
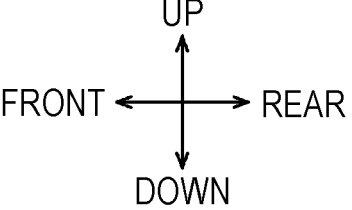
FIG. 5 is a cross-sectional view taken along a line V-V in FIG. 3.

As illustrated in FIGS. 2 and 5, the pretensioner casing 11 is provided with an opening 11a through which the locking base 6 is inserted, and the opening 11a includes internal teeth 11b formed on a circumferential edge of the opening 11a. On the other hand, the locking base 6 includes a lock member 61 configured to be engageable with the internal teeth 11b. The lock member 61 is engaged with the internal teeth 11b to prevent the locking base 6 from being rotated in the pull-out direction, in the emergency of the vehicle.

Figure 10:
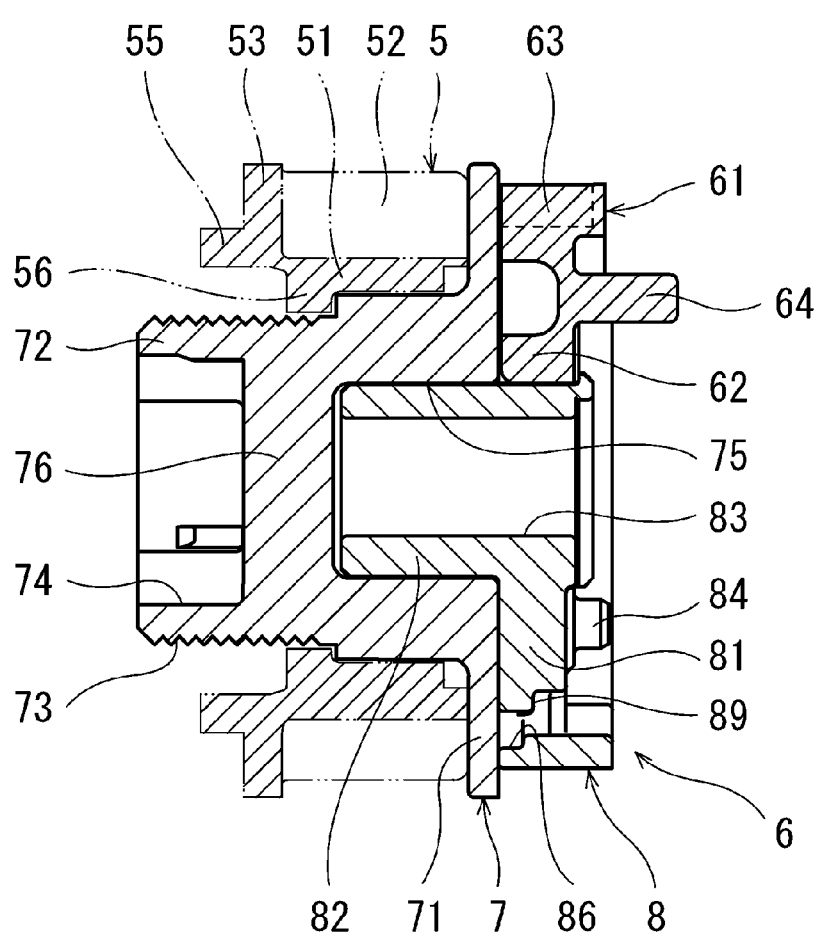
FIG. 10 is a cross-sectional view of the drive wheel and a locking base.
Figure 11:
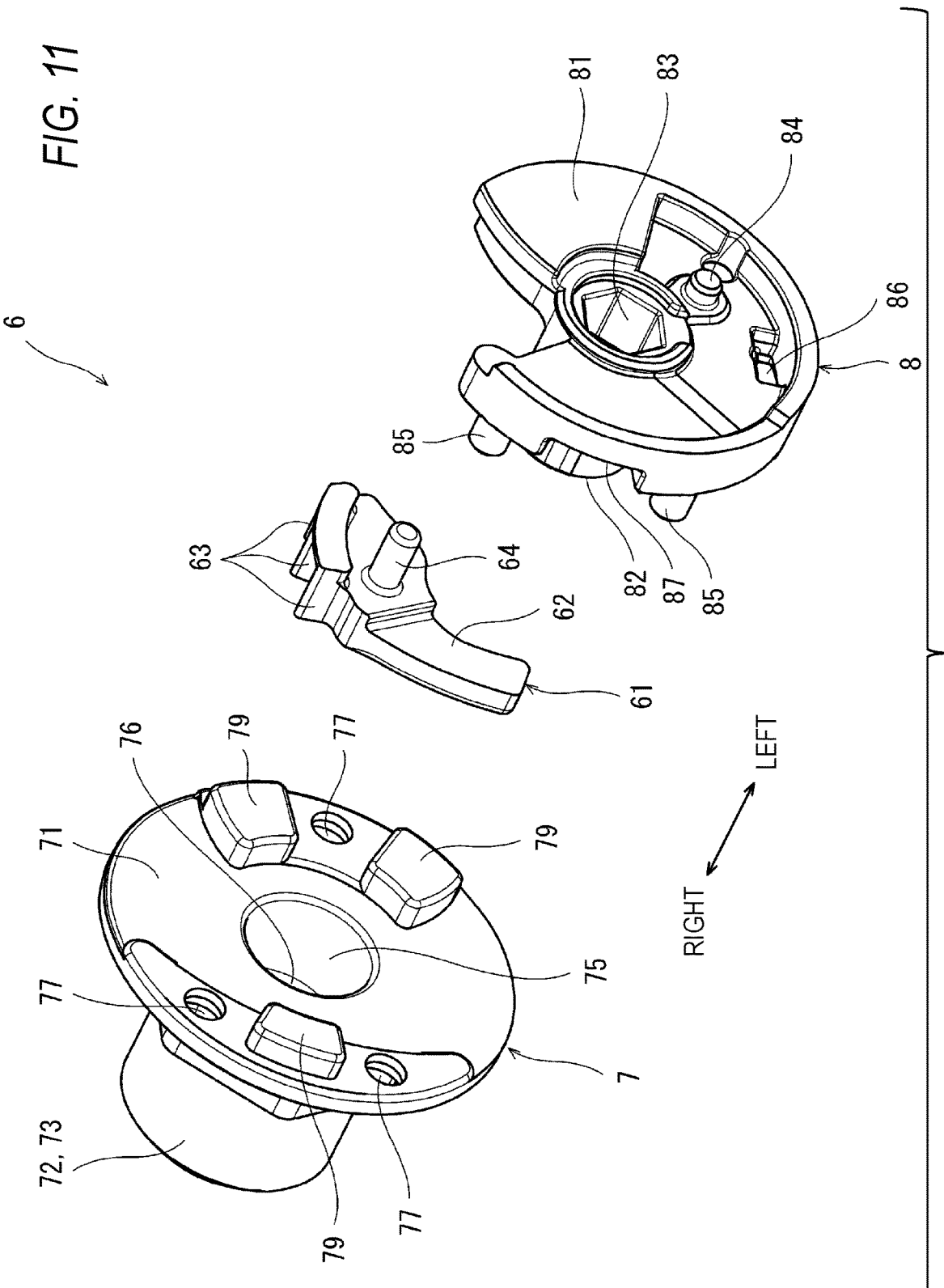
FIG. 11 is an exploded perspective view of the locking base and a lock member.
Figure 12:
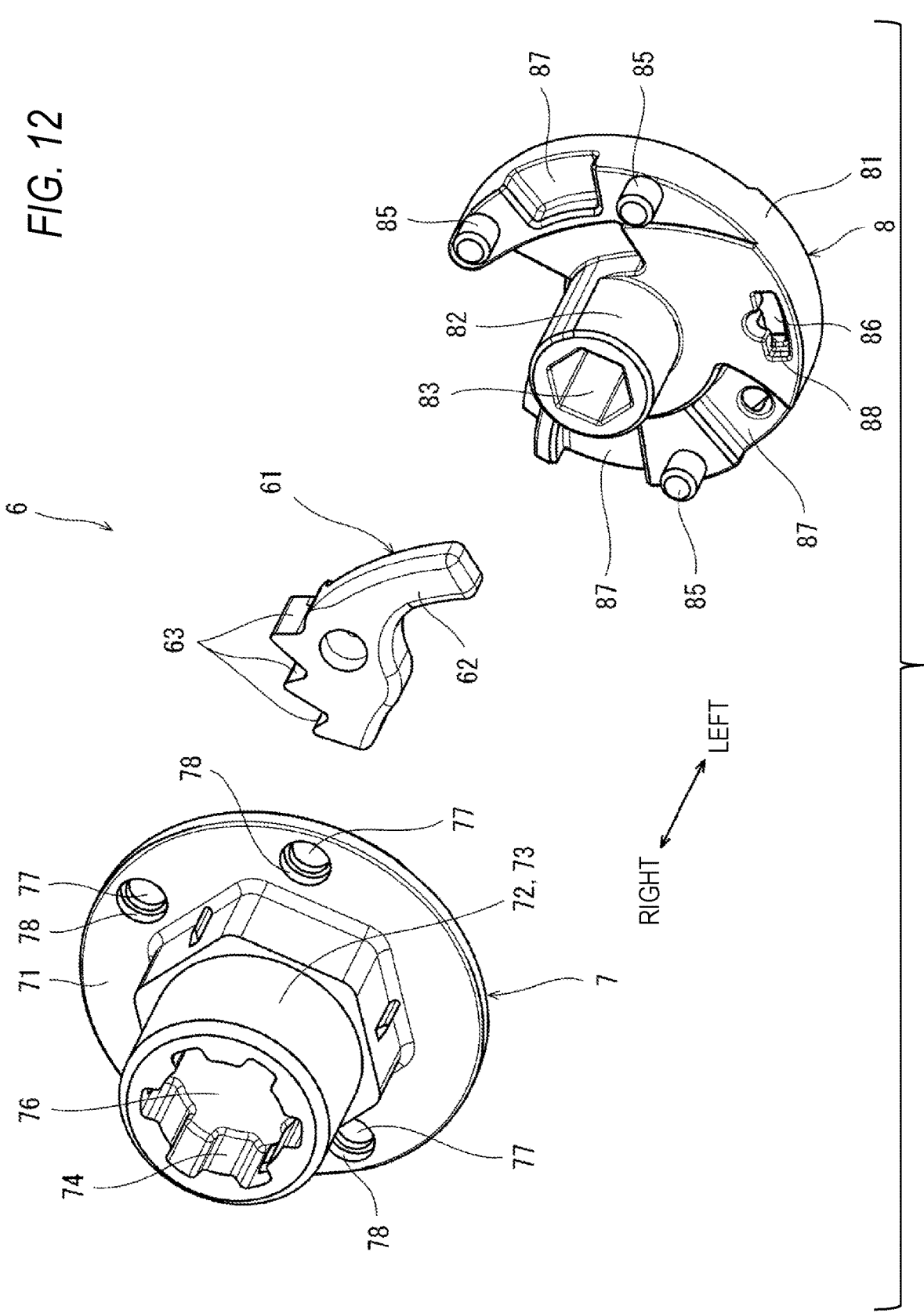
FIG. 12 is an exploded perspective view of the locking base and the lock member as viewed from an opposite side.

As illustrated in FIGS. 10 to 12, the locking base 6 includes a first base member 7 to which the drive wheel 5 is attached, and a second base member 8 which is attached to the first base member 7 on a side of the first base member 7 opposite to the drum main body 3 without being rotatable relative to the first base member 7. The lock member 61 is held between the first base member 7 and the second base member 8.

More specifically, the first base member 7 includes a disk-shaped first main body portion 71 and a protruding portion 72 that protrudes from the first main body portion 71 in the rightward direction. As illustrated in FIG. 3, the drive wheel 5 is disposed between the first main body portion 71 and the first end surface 31 of the drum main body 3, and the protruding portion 72 penetrates the drive wheel 5. A proximal end portion of the protruding portion 72 is formed to have a hexagonal cross-sectional shape. The fitting hole of the main body portion 51 of the drive wheel 5 is also formed to have a hexagonal cross section, and by fitting the proximal end portion into the fitting hole, the drive wheel 5 is attached to the first base member 7 without being rotatable relative to the first base member 7. The male screw 73 is formed on an outer circumferential surface of a distal end side of the protruding portion 72.

The first base member 7 includes a first recess 74 that is recessed from a distal end surface of the protruding portion 72, and a second recess 75 that is coaxial with the first recess 74 and that is recessed from a surface of the first main body portion 71 on a side opposite to the drive wheel 5. The first recess 74 is a spline-shaped recess for coupling with the coupling portion 42 of the torsion bar 4A, and the coupling portion 42 is fitted into the first recess 74. In the present embodiment, the second recess 75 has a circular cross-sectional shape. In the present embodiment, the first base member 7 includes a partition 76 that separates the first recess 74 and the second recess 75. That is, the first recess 74 and the second recess 75 are bottomed.

The second base member 8 includes a plate-shaped second main body portion 81 that overlaps the first main body portion 71, and a fitting protrusion 82 that protrudes from the second main body portion 81 in the rightward direction. In the present embodiment, the second main body portion 81 includes three engagement concave portions 87, and by engaging respective three engagement convex portions 79 provided on the first main body portion 71 with the engagement concave portions 87, the second base member 8 is attached to the first base member 7 without being rotatable relative to the first base member 7. The fitting protrusion 82 has a circular cross-sectional shape, and the fitting protrusion 82 is fitted into the second recess 75. However, the second recess 75 and the fitting protrusion 82 may have a non-circular cross sectional shape, and by fitting the fitting protrusion 82 into the second recess 75, the second base member 8 may be attached to the first base member 7 without being rotatable relative to the first base member 7. In this case, the engagement concave portions 87 and the engagement convex portions 79 may be omitted.

In the present embodiment, the second main body portion 81 of the second base member 8 includes three crimping protrusions 85 protruding in the rightward direction, whereas the first main body portion 71 of the first base member 7 is provided with three through holes 77 through which the crimping protrusions 85 are inserted. A crimping concave portion 78 that is coaxial with the through hole 77 and that has a larger diameter than the through hole 77 is formed on a side of the first main body portion 71 opposite to the second main body portion 81. A portion of each crimping protrusion 85, which protrudes from the through hole 77, is crimped to have a larger diameter than the through hole 77 in the crimping concave portion 78 (in FIGS. 11 and 12, the protrusion 85 is drawn in a shape before).

The lock member 61 includes a substantially arc-shaped and plate-shaped main body portion 62 that is held by the first main body portion 71 of the first base member 7 and the second main body portion 81 of the second base member 8, a plurality of (three in the illustrated example) engaging teeth 63 which are formed on an outer side surface of the main body portion 62 and configured to be engageable with the internal teeth 11b, and an operation shaft 64 that protrudes from the main body portion 62 in the leftward direction. That is, the operation shaft 64 is parallel to the axial direction of the winding drum 1B. The operation shaft 64 is operated by a guide member 14 (see FIGS. 2 and 7).

Figure 15A:
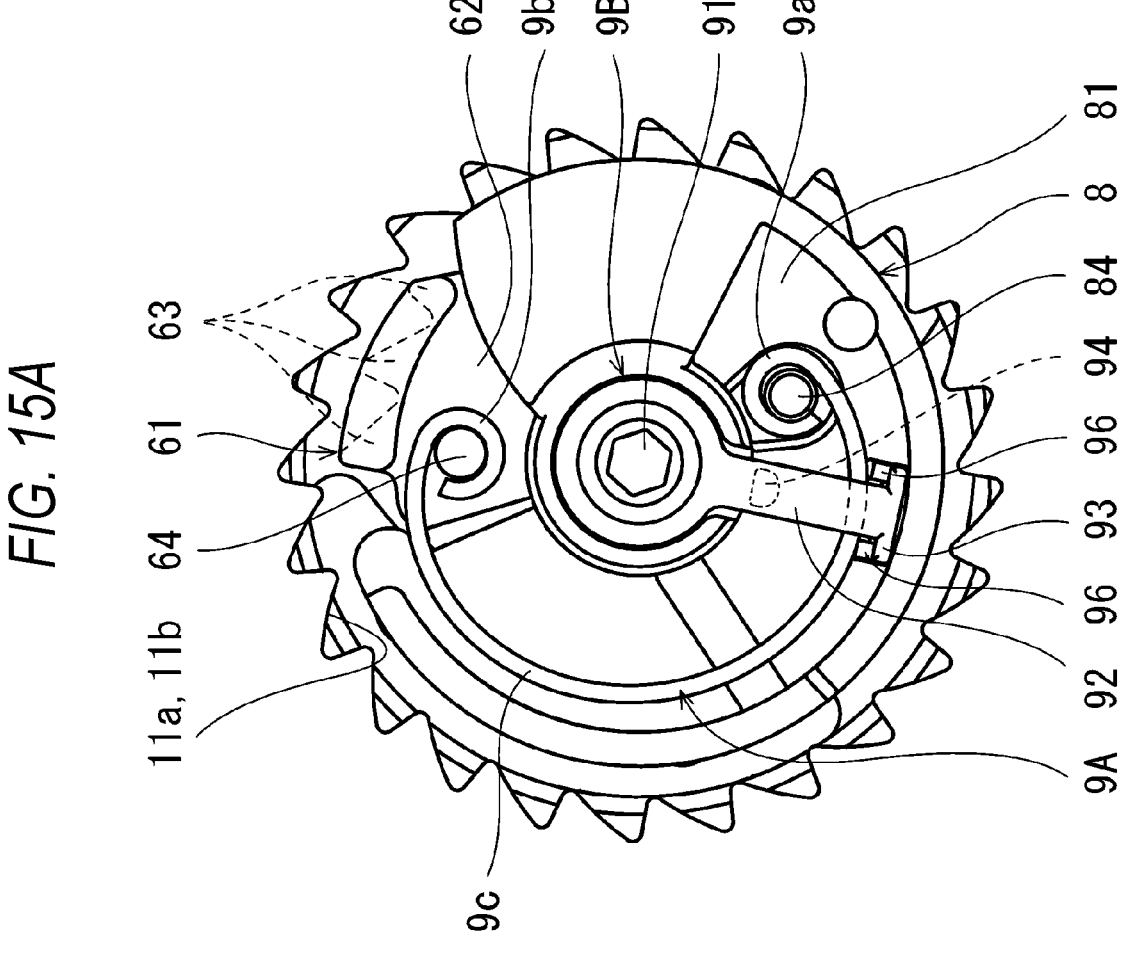
FIG. 15A illustrates a state of the biasing member when the lock member is located at a non-engagement position.
Figure 15B:
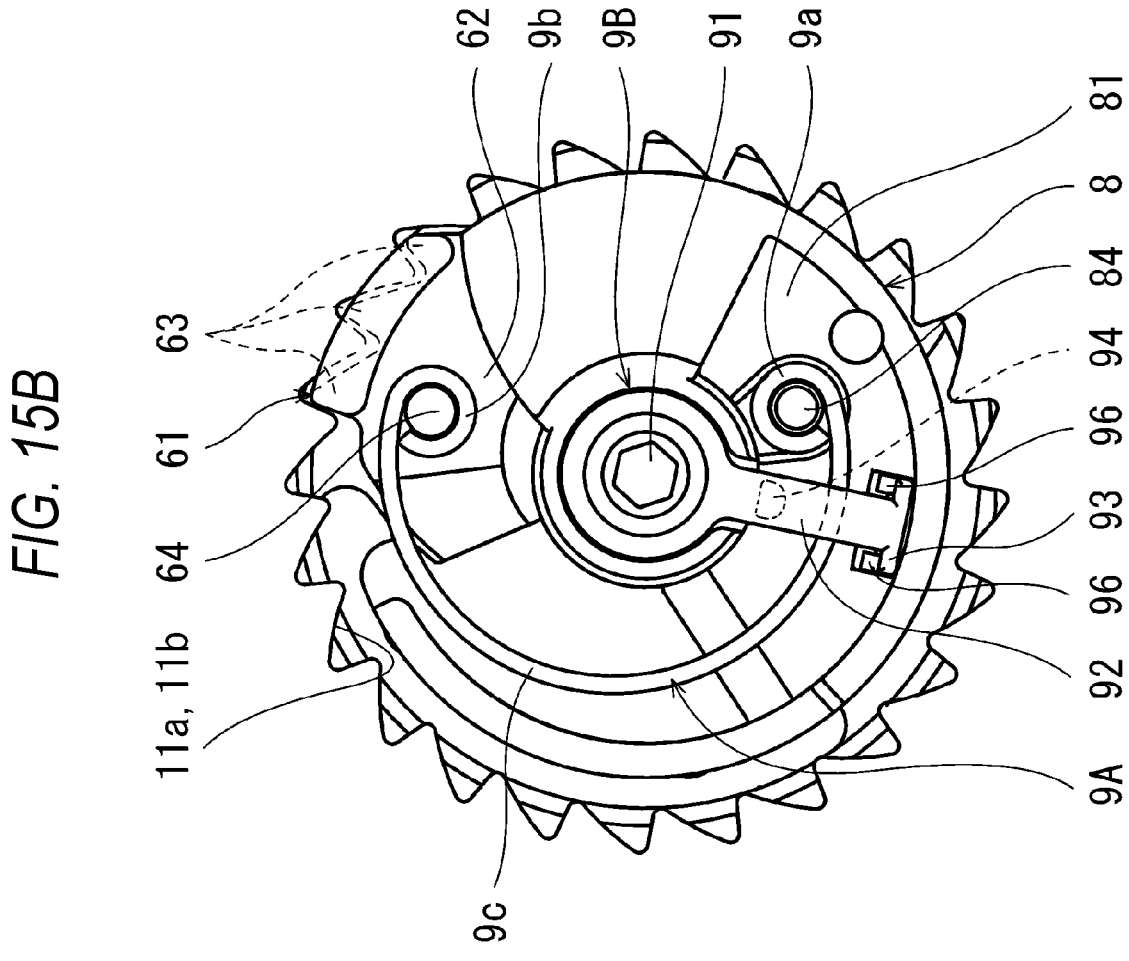
FIG. 15B illustrates a state of the biasing member when the lock member is located at an engagement position.

The lock member 61 is configured to be movable between a non-engagement position at which the winding drum 1B illustrated in FIG. 15A is allowed to rotate in the pull-out direction, and an engagement position at which the winding drum 1B illustrated in FIG. 15B is prevented from being rotated in the pull-out direction. The lock member 61 is moved between the non-engagement position and the engagement position by the guide member 14.

The second main body portion 81 of the second base member 8 of the locking base 6 includes an attachment protrusion 84 protruding from the second main body portion 81 in the leftward direction. That is, the attachment protrusion 84 protrudes from the left end portion of the winding drum 1B in the leftward direction. The biasing member 9A is spanned between the attachment protrusion 84 and the operation shaft 64 of the lock member 61.

In the present embodiment, the biasing member 9A is a return spring having a substantially arc shape as illustrated in FIG. 7. Specifically, the biasing member 9A includes one end portion 9a attached to the attachment protrusion 84, the other end portion 9b attached to the operation shaft 64 of the lock member 61, and a connecting portion 9c connecting the one end portion 9a and the other end portion 9b. The biasing member 9A biases the lock member 61 so as to be maintained at the non-engagement position illustrated in FIG. 15A.

Figure 13:
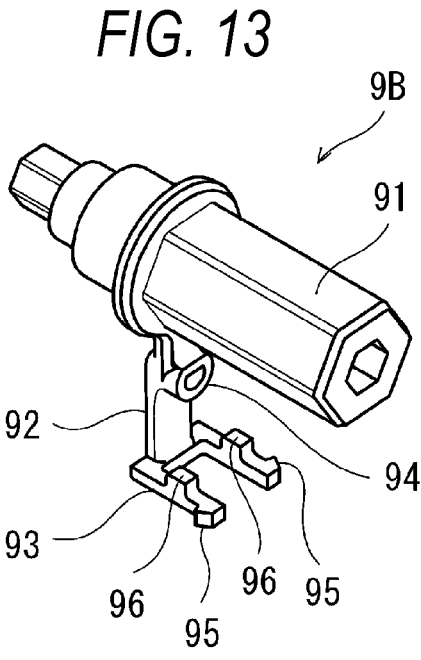
FIG. 13 is a perspective view of the shaft member as viewed from a side opposite to that of FIG. 7.

As illustrated in FIGS. 7 and 13, the shaft member 9B includes a shaft portion 91 coaxial with the winding drum 1B, and an arm 92 extending outward from the shaft portion 91 in the radial direction. A right side (proximal end side) portion of the shaft portion 91 has a hexagonal cross-sectional shape.

On the other hand, as illustrated in FIG. 11, the second base member 8 of the locking base 6 is provided with a fitting hole 83 that is coaxial with the fitting protrusion 82 and that is opened in the leftward direction. In the present embodiment, as illustrated in FIG. 12, the fitting hole 83 penetrates the second base member 8 and is also opened in the rightward direction. The fitting hole 83 has a hexagonal cross-sectional shape. The right side portion of the shaft portion 91 of the shaft member 9B is fitted into the fitting hole 83.

As illustrated in FIG. 3, a left side (distal end side) portion of the shaft portion 91 of the shaft member 9B penetrates the guide member 14 and pivotably supports the guide member 14. A left end (distal end) portion of the shaft portion 91, which is located in the leftward direction with respect to the guide member 14, is rotatably supported by a cover member 17, which will be described later, of the lock unit 1D.

Figure 14:
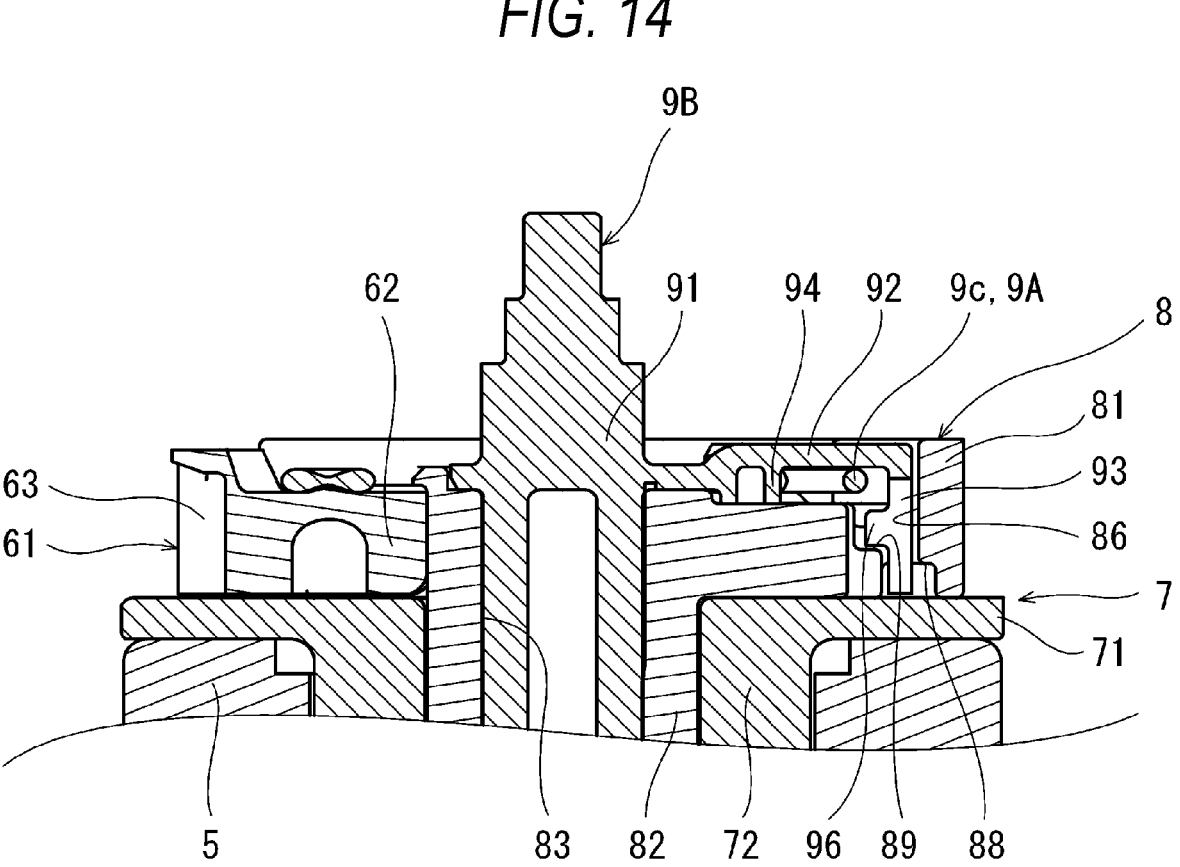
FIG. 14 is a cross-sectional view of the shaft member and the locking base at a position passing through an arm of the shaft member.

As illustrated in FIG. 7, the arm 92 of the shaft member 9B is configured to be able to come into contact with the connecting portion 9c of the biasing member 9A from a side opposite to the winding drum 1B. As illustrated in FIG. 14, a space larger than a thickness of the connecting portion 9c of the biasing member 9A in the axial direction of the winding drum 1B is provided between the second main body portion 81 of the second base member 8 and the arm 92. For example, a diameter of a cross section of the connecting portion 9c is about 1.0 mm, and the space between the second main body portion 81 of the second base member 8 and the arm 92 is about 1.5 mm. As described above, a movement space of the biasing member 9A is secured between the second base member 8, which is a part of the winding drum 1B, and the arm 92 of the shaft member 9B, and thus the operation of the lock member 61 is not hindered.

The arm 92 includes, at a distal end, a hook 93 extending in the rightward direction. On the other hand, the second main body portion 81 of the second base member 8 is provided with an engagement hole 86 (see FIGS. 11 and 12) with which the hook 93 is engaged. The engagement hole 86 extends in a direction orthogonal to an extending direction of the arm 92. As illustrated in FIG. 13, a distal end of the hook 93 is formed with a pair of engaging claws 95 protruding in a width direction of the hook 93. As illustrated in FIG. 12, on a right side of the engagement hole 86, a pair of first concave portions 88 are provided on both sides of the engagement hole 86 in a longitudinal direction. In a case where the hook 93 is inserted into the engagement hole 86 and the pair of engaging claws 95 are engaged with the respective first concave portions 88, the arm 92 is prevented from moving in the leftward direction, and the hook 93 is prevented from coming off the engagement hole 86.

Further, as illustrated in FIG. 13, the arm 92 includes an intermediate protrusion 94 protruding from the arm 92 toward the second main body portion 81 of the second base member 8 at a position between the shaft portion 91 and the hook 93. In a case where the shaft member 9B is attached to the second base member 8, a distal end of the intermediate protrusion 94 comes into contact with the second main body portion 81 of the second base member 8. The connecting portion 9c of the biasing member 9A is disposed between the intermediate protrusion 94 and the hook 93 (see FIGS. 15A and 15B), and thus it is possible to prevent unexpected movement of the biasing member 9A to both sides in the radial direction of the winding drum 1B.

As illustrated in FIG. 13, the hook 93 includes a pair of distal end protrusions 96 protruding toward the shaft portion 91 on a proximal end side of the hook 93 with respect to the engaging claws 95. As illustrated in FIGS. 10 and 14, the engagement hole 86 includes a second concave portion 89 recessed toward a fitting hole 83 side on a left side of the engagement hole 86. In a case where the shaft member 9B is attached to the second base member 8, there is a slight space (for example, 0.1 mm to 0.2 mm) between a right side of the distal end protrusion 96 and a bottom of the second concave portion 89, and in a case where the arm 92 is bent and the hook 93 is moved to a right side, the right side of the distal end protrusion 96 is configured to be able to come into contact with the bottom of the second concave portion 89 in the axial direction of the winding drum 1B. That is, the distal end protrusion 96 functions as a contact portion with the locking base 6.

In this way, not only the distal end of the intermediate protrusion 94 comes into contact with the second main body portion 81 of the second base member 8, but also the right side of the distal end protrusion 96 comes into contact with the bottom of the second concave portion 89, whereby the space, in the axial direction of the winding drum 1B, between the second main body portion 81 of the second base member 8 and the arm 92 is maintained in a state of being larger than the thickness of the connecting portion 9c of the biasing member 9A in the axial direction of the winding drum 1B. In such a structure, it is possible to reduce a strength required for the arm 92 to reduce a size and a weight of the shaft member 9B.

As illustrated in FIG. 2, the lock unit 1D includes the cover member 17 that houses the guide member 14 and a vehicle sensor 16. As illustrated in FIG. 3, the cover member 17 is attached to the first side wall 21 of the housing 2 via the pretensioner casing 11.

The guide member 14 includes a webbing sensor 15. The webbing sensor 15 is configured to be activated in a case where the webbing 10 is rapidly pulled out, whereby the guide member 14 is prevented from being rotated in the pull-out direction. The vehicle sensor 16 is configured to be activated in a case where an acceleration of the vehicle changes largely, whereby the guide member 14 is prevented from being rotated in the pull-out direction.

In a case where the guide member 14 is prevented from being rotated in the pull-out direction, the locking base 6 is rotated relative to the guide member 14 together with the drum main body 3, and the operation shaft 64 of the lock member 61 is operated in a guide hole 14a (see FIG. 7) of the guide member 14, whereby the lock member 61 moves from the non-engagement position illustrated in FIG. 15A to the engagement position illustrated in FIG. 15B against a biasing force of the biasing member 9A. Accordingly, the lock member 61 is engaged with the internal teeth 11b of the pretensioner casing 11, and the winding drum 1B (the locking base 6 in the present embodiment) is prevented from being rotated in the pull-out direction.

As described above, in the seat belt retractor 1 according to the present embodiment, the shaft member 9B is attached to the locking base 6 constituting the left end portion of the winding drum 1B, and thus the biasing member 9A is prevented from being detached from the winding drum 1B by the arm 92 positioned on the side of the connecting portion 9c of the biasing member 9A opposite to the winding drum 1B. In addition, not all of the biasing member 9A is covered by the arm 92, and thus a worker can visually check the biasing member 9A or press the biasing member 9A with a finger to prevent the same from moving at the time of assembling work. Therefore, it is possible to prevent the biasing member 9A from being detached from the winding drum 1B without impairing workability of assembly.

In the present embodiment, the attachment protrusion 84 of the locking base 6 and the operation shaft 64 of the lock member 61 are oriented in the same direction, and the one end portion 9a and the other end portion 9b of the biasing member 9A can be attached to the winding drum 1B and the lock member 61 from the same direction, and thus an attachment work of the biasing member 9A is facilitated.

Further, in the present embodiment, the shaft member 9B can be attached to the winding drum 1B by inserting the shaft portion 91 of the shaft member 9B into the fitting hole 83 of the winding drum 1B. In addition, an attachment direction of the shaft member 9B is the same as a direction in which the arm 92 of the shaft member 9B can come into contact with the connecting portion 9c of the biasing member 9A, and thus an attachment work of the shaft member 9B is facilitated.

In the present embodiment, the hook 93 of the shaft member 9B can prevent the unexpected movement of the biasing member 9A outward in the radial direction of the winding drum 1B, and the intermediate protrusion 94 of the shaft member 9B can prevent the unexpected movement of the biasing member 9A inward in the radial direction of the winding drum 1B.

<Modification>

The foregoing description of the exemplary embodiments of the present invention has been provided for the purposes of illustration and description. It is not intended to be exhaustive or to limit the invention to the precise forms disclosed. Obviously, many modifications and variations will be apparent to practitioners skilled in the art. The embodiments were chosen and described in order to best explain the principles of the invention and its practical applications, thereby enabling others skilled in the art to understand the invention for various embodiments and with the various modifications as are suited to the particular use contemplated. It is intended that the scope of the invention be defined by the following claims and their equivalents.

For example, the torsion bar 4A may be omitted, and the locking base 6 may be integrated with the drum main body 3.

The pretensioner 1C may be omitted. In this case, the opening 21a of the first side wall 21 of the housing 2 has the internal teeth 11b formed on a circumferential edge of the opening 21a, and the lock member 61 may be engaged with the internal teeth 11b in an emergency of a vehicle.

The biasing member 9A is not necessarily a substantially arc-shaped spring, and may be a tension coil spring including one end portion attached to the left end portion of the winding drum 1B, and the other end portion attached to the lock member 61. In this case, the connecting portion 9c is a coil portion, and the coil portion is extended by moving the lock member 61 from the non-engagement position to the engagement position. Alternatively, the biasing member 9A may be a compression coil spring including one end portion attached to the left end portion of the winding drum 1B and the other end portion attached to the lock member 61. In this case, the connecting portion 9c is a coil portion, and the coil portion is compressed by moving the lock member 61 from the non-engagement position to the engagement position.

The hook 93 of the shaft member 9B does not necessarily have to be provided with the distal end protrusion 96 as a contact portion, and the distal end of the hook 93 serves as a contact portion and can come into contact with the first main body portion 71 of the first base member 7 in the axial direction of the winding drum 1B, whereby the space in the axial direction of the winding drum 1B between the second main body portion 81 of the second base member 8 and the arm 92 may be maintained in a state of being larger than the thickness of the connecting portion 9c of the biasing member 9A in the axial direction of the winding drum 1B.

CONCLUSION

As a first aspect, the present disclosure provides a seat belt retractor including: a housing including a pair of side walls facing each other; a winding drum configured to wind up a webbing, the winding drum being housed between the pair of side walls so as to be rotateable in a winding direction and a pull-out direction of the webbing; a lock member provided at a first end portion, of the winding drum, located on one side in an axial direction of the winding drum, the lock member being configured to be movable between: an engagement position in which rotation of the winding drum in the pull-out direction is prevented by the lock member being engaged with the housing or a member attached to the housing; and a non-engagement position in which the rotation of the winding drum in the pull-out direction is allowed, the lock member being moved to the engagement position in an emergency of a vehicle; a biasing member including: one end portion attached to the first end portion of the winding drum; the other end portion attached to the lock member; and a connecting portion connecting the one end portion and the other end portion, the biasing member being configured to bias the lock member to maintain the lock member at the non-engagement position; a shaft member attached to the first end portion of the winding drum, the shaft member including a shaft portion coaxial with the winding drum; and a cover member attached to the housing, the cover member rotatably supporting the shaft portion of the shaft member, in which the shaft member includes an arm extending, from the shaft portion, outward in a radial direction, and the arm is configured to be able to come into contact with the connecting portion of the biasing member from a side opposite to the winding drum.

According to the above configuration, by attaching the shaft member to the first end portion of the winding drum, the biasing member is prevented from being detached from the winding drum by the arm positioned on the side of the connecting portion of the biasing member opposite to the winding drum. In addition, not all of the biasing member is covered by the arm, and thus a worker can visually check the biasing member or press the biasing member with a finger to prevent the same from moving at the time of assembling work. Therefore, it is possible to prevent the biasing member from being detached from the winding drum without impairing workability of assembly.

As a second aspect, according to the first aspect, the seat belt retractor further includes: a guide member pivotally supported by the shaft portion of the shaft member, the guide member being configured to move the lock member between the engagement position and the non-engagement position, in which the lock member may include an operation shaft parallel to the axial direction of the winding drum, the operation shaft being operated by the guide member, the first end portion of the winding drum include an attachment protrusion protruding from the first end portion to the one side in the axial direction of the winding drum, and the one end portion of the biasing member is attached to the attachment protrusion, and the other end portion of the biasing member is attached to the operation shaft. According to the configuration, the one end portion and the other end portion of the biasing member can be attached to the winding drum and the lock member from the same direction, and thus an attachment work of the biasing member is facilitated.

As a third aspect, according to the first aspect or the second aspect, the first end portion of the winding drum may be provided with a fitting hole opened toward the one side in the axial direction of the winding drum, and the shaft portion of the shaft member may be fitted into the fitting hole. According to the configuration, the shaft member can be attached to the winding drum by inserting the shaft portion of the shaft member into the fitting hole of the winding drum. In addition, an attachment direction of the shaft member is the same as a direction in which the arm of the shaft member can come into contact with the connecting portion of the biasing member, and thus an attachment work of the shaft member is facilitated.

As a fourth aspect, according to any one of the first to third aspects, the shaft member may include a hook extending from a distal end of the arm to the second side in the axial direction of the winding drum, and the first end portion of the winding drum may be provided with an engagement hole with which the hook is engaged. According to the configuration, the hook of the shaft member can prevent unexpected movement of the biasing member outward in the radial direction of the winding drum.

As a fifth aspect, according to the fourth aspect, the arm may include an intermediate protrusion protruding from the arm toward the winding drum and the connecting portion of the biasing member may be disposed between the hook and the intermediate protrusion. According to the configuration, the intermediate protrusion of the shaft member can prevent unexpected movement of the biasing member inward in the radial direction of the winding drum.

As a sixth aspect, according to any one of the first to fifth aspects, a space larger than a thickness of the connecting portion of the biasing member may be provided between the first end portion of the winding drum and the arm of the shaft member. According to the configuration, a movement space of the biasing member is secured between the winding drum and the arm of the shaft member, and thus the operation of the lock member is not hindered.

As a seventh aspect, according to the sixth aspect, the hook of the shaft member may include a contact portion configured to be able to come into contact with the first end portion of the winding drum in the axial direction of the winding drum, and in a case where the intermediate protrusion of the arm and the contact portion of the hook come into contact with the first end portion of the winding drum, the space in the axial direction of the winding drum between the first end portion of the winding drum and the arm of the shaft member may be larger than the thickness, in the axial direction of the winding drum, of the connecting portion of the biasing member. According to the configuration, the intermediate protrusion and the contact portion of the shaft member come into contact with the first end portion of the winding drum, whereby the movement space of the biasing member is secured between the winding drum and the arm of the shaft member, and thus a strength required for the arm can be reduced to reduce a size and a weight of the shaft member.

As an eighth aspect, according to any one of the first to seventh aspects, for example, the seat belt retractor may further include a pretensioner including a pretensioner casing attached to the housing, the pretensioner being configured to rotate the winding drum in the winding direction in the emergency of the vehicle, in which the lock member may be configured to be engaged with the pretensioner casing.

What is claimed is:

1. A seat belt retractor comprising:

a housing including a pair of side walls facing each other;

a winding drum configured to wind up a webbing, the winding drum being housed between the pair of side walls so as to be rotatable in a winding direction and a pull-out direction of the webbing;

a lock member provided at a first end portion, of the winding drum, located on one side in an axial direction of the winding drum, the lock member being configured to be movable between: an engagement position in which rotation of the winding drum in the pull-out direction is prevented by the lock member being engaged with the housing or a member attached to the housing; and a non-engagement position in which the rotation of the winding drum in the pull-out direction is allowed, the lock member being moved to the engagement position in an emergency of a vehicle;

a biasing member including: one end portion attached to the first end portion of the winding drum; an other end portion attached to the lock member; and a connecting portion connecting the one end portion and the other end portion, the biasing member being configured to bias the lock member to maintain the lock member at the non-engagement position;

a shaft member attached to the first end portion of the winding drum, the shaft member including a shaft portion coaxial with the winding drum; and a cover member attached to the housing, the cover member rotatably supporting the shaft portion of the shaft member, wherein the shaft member includes an arm extending, from the shaft portion, outward in a radial direction, the arm is configured to be able to come into contact with the connecting portion of the biasing member from a side opposite to the winding drum, wherein the shaft member includes a hook extending from a distal end of the arm to the other side in the axial direction of the winding drum, and the first end portion of the winding drum is provided with an engagement hole with which the hook is engaged.

2. The seat belt retractor according to claim 1, further comprising:

a guide member pivotably supported by the shaft portion of the shaft member, the guide member being configured to move the lock member between the engagement position and the non-engagement position, wherein the lock member includes an operation shaft parallel to the axial direction of the winding drum, the operation shaft being operated by the guide member, the first end portion of the winding drum includes an attachment protrusion protruding from the first end portion to the one side in the axial direction of the winding drum, and the one end portion of the biasing member is attached to the attachment protrusion, and the other end portion of the biasing member is attached to the operation shaft.

3. The seat belt retractor according to claim 1, wherein the first end portion of the winding drum is provided with a fitting hole opened toward the one side in the axial direction of the winding drum, and the shaft portion of the shaft member is fitted into the fitting hole.

4. The seat belt retractor according to claim 1, wherein the arm includes an intermediate protrusion protruding from the arm toward the winding drum, and the connecting portion of the biasing member is disposed between the hook and the intermediate protrusion.

5. The seat belt retractor according to claim 1, wherein a space larger than a thickness of the connecting portion of the biasing member is provided between the first end portion of the winding drum and the arm of the shaft member.

6. The seat belt retractor according to claim 4, wherein the hook of the shaft member includes a contact portion configured to be able to come into contact with the first end portion of the winding drum in the axial direction of the winding drum, and in a case where the intermediate protrusion of the arm and the contact portion of the hook come into contact with the first end portion of the winding drum, the space in the axial direction of the winding drum between the first end portion of the winding drum and the arm of the shaft member is larger than the thickness, in the axial direction of the winding drum, of the connecting portion of the biasing member.

7. The seat belt retractor according to claim 1, further comprising:

a pretensioner including a pretensioner casing attached to the housing, the pretensioner being configured to rotate the winding drum in the winding direction, in the emergency of the vehicle, wherein the lock member is configured to be engaged with the pretensioner casing.

\* \* \* \* \*